(12) United States Patent
Nakane

(10) Patent No.: US 7,276,825 B2
(45) Date of Patent: Oct. 2, 2007

(54) STEPPING MOTOR

(75) Inventor: Hideyuki Nakane, Nishio (JP)

(73) Assignee: DENSO CORPORATION, Kariya (JP)

( * ) Notice: Subject to any disclaimer, the term of this patent is extended or adjusted under 35 U.S.C. 154(b) by 168 days.

(21) Appl. No.: 11/253,578

(22) Filed: Oct. 20, 2005

(65) Prior Publication Data
US 2006/0097588 A1   May 11, 2006

(30) Foreign Application Priority Data
Nov. 11, 2004   (JP) .............. 2004-328125

(51) Int. Cl.
*H02K 37/00*   (2006.01)
(52) U.S. Cl. .................. 310/49 R; 310/89
(58) Field of Classification Search .......... 310/49 R, 310/89, 91, 254
See application file for complete search history.

(56) References Cited

U.S. PATENT DOCUMENTS

| 4,782,353 | A * | 11/1988 | Ogihara et al. ........ 396/463 |
| 6,331,741 | B1 * | 12/2001 | Suzuki ................. 310/49 R |
| 6,989,615 | B2 * | 1/2006 | Abe et al. ............. 310/49 R |
| 7,071,593 | B2 * | 7/2006 | Matsushita et al. ...... 310/257 |
| 2003/0111918 | A1 * | 6/2003 | Nishikawa et al. ......... 310/89 |
| 2004/0178685 | A1 * | 9/2004 | Abe et al. ............ 310/49 R |
| 2005/0057105 | A1 * | 3/2005 | Kasahara ............. 310/49 R |

FOREIGN PATENT DOCUMENTS

| JP | A-2003-111379 | 4/2003 |
| JP | A-2005-024501 | 1/2005 |

* cited by examiner

*Primary Examiner*—Thanh Lam
(74) *Attorney, Agent, or Firm*—Posz Law Group, PLC

(57) ABSTRACT

A stator is press fitted into a recess of a casing. The recess has a chamfered portion. The chamfered portion is arranged between an inlet opening end of the recess and a bottom of the recess in such a manner that a width of the recess is progressively increased along the chamfered portion from a bottom side toward an inlet opening end side of the recess. The chamfered portion has a plurality of slant surfaces, which are arranged one after another in the press fitting direction of the stator. Angles of the plurality of slant surfaces with respect to the press fitting direction of the stator decrease from the inlet opening end side of the recess toward the bottom side of the recess.

7 Claims, 5 Drawing Sheets

STEPPING MOTOR

CROSS REFERENCE TO RELATED APPLICATION

This application is based on and incorporates herein by reference Japanese Patent Application No. 2004-328125 filed on Nov. 11, 2004.

BACKGROUND OF THE INVENTION

1. Field of the Invention

The present invention relates to a stepping motor.

2. Description of Related Art

One previously proposed stepping motor includes a casing, which houses a stator and a magnet rotor. The stator has a plurality of salient poles, which extend radially inwardly. The magnet rotor is rotatably arranged inside the stator in such a manner that a predetermined space is provided between each salient pole and the magnet rotor. The stator is immovably secured in the casing, and the magnet rotor is rotatably supported in the casing (see, for example, Japanese Unexamined Patent Publication No. 2003-111379).

In the case of the above stepping motor, the stator is press fitted into a recess of the casing to immovably secure the stator in the casing. In order to facilitate the press fitting operation of the stator into the casing, an inlet opening end of the recess is chamfered. That is, each lateral side of the inlet opening end of the casing is provided with a single slant surface, so that a width of the recess is progressively increased from a bottom side of the recess toward the inlet opening end side of the recess. In this way, the positioning of the stator into the recess of the casing is eased.

In the process of press fitting the stator into the recess of the casing, a corner of the stator contacts the slant surface at the chamfered inlet opening end. Thereafter, the stator is further pressed toward the bottom of the recess while expanding the width of the recess.

At this time, the casing is likely scraped by each corresponding corner of the stator, so that scraped debris (i.e., foreign object) is generated from the casing. When the foreign object is left in the stepping motor, the foreign object may penetrate into a space of a torque transmission mechanism (e.g., a gear train G) or into a space between the magnet rotor and the salient pole of the stator in the stepping motor. Such a foreign object may possibly limit smooth movement of the stepping motor.

To obviate the above disadvantage, the foreign object must be removed after the press fitting of the stator in the manufacturing of the stepping motor. This disadvantageously increases the number of manufacturing steps of the stepping motor and thereby causes an increase in the manufacturing costs.

SUMMARY OF THE INVENTION

The present invention addresses the above disadvantage. According to one aspect of the present invention, there is provided a stepping motor, which includes a stator and a casing. The casing receives and holds the stator. The casing has a recess, into which the stator is securely press fitted through an inlet opening end of the recess in a press fitting direction. The recess has a chamfered portion and a press fitting portion, which are arranged one after another in this order in a direction away from the inlet opening end of the recess. The chamfered portion is arranged between the inlet opening end of the recess and a bottom of the recess in such a manner that a width of the recess is progressively increased along the chamfered portion from a bottom side of the recess toward an inlet opening end side of the recess. The chamfered portion has a plurality of slant surfaces, which are arranged one after another in the press fitting direction of the stator. Angles of the plurality of slant surfaces with respect to the press fitting direction of the stator decrease from the inlet opening end side of the recess toward the bottom side of the recess. The press fitting portion is arranged adjacent to the chamfered portion and extends toward the bottom of the recess in a direction parallel to the press fitting direction of the stator.

BRIEF DESCRIPTION OF THE DRAWINGS

The invention, together with additional objectives, features and advantages thereof, will be best understood from the following description, the appended claims and the accompanying drawings in which:

DETAILED DESCRIPTION OF THE INVENTION

A stepping motor according to an embodiment of the present invention will be described with reference to the accompanying drawings. In the present embodiment, the stepping motor 1 is installed in an instrument cluster 100 of a vehicle to drive a pointer 103 of the instrument cluster 100. The instrument cluster 100 is disposed in front of a vehicle driver seat in such a manner that the instrument cluster 100 is visually recognizable by a vehicle driver. The instrument cluster 100 indicates various types of information relevant to the vehicle.

Figure 1:
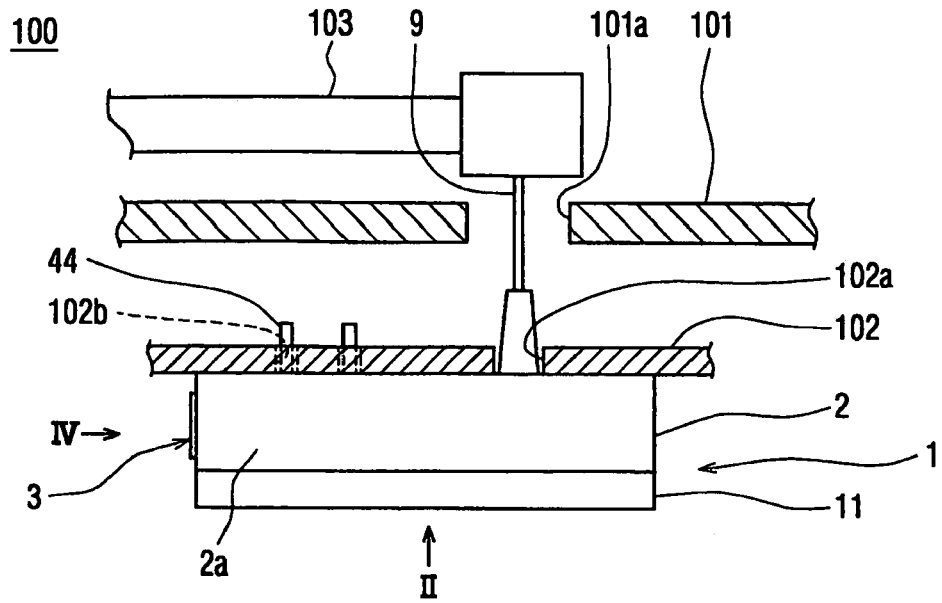
FIG. 1 is a partially cross sectional view of an instrument cluster, which includes a stepping motor according to an embodiment of the present invention.

Referring to FIG. 1, the instrument cluster 100 includes a dial plate 101, a printed circuit board 102 and the stepping motor 1. At a back side of the dial plate 101, the printed circuit board 102 is disposed parallel to the dial plate 101. The stepping motor 1 is fixed to the printed circuit board 102.

As shown in FIG. 1, a pointer shaft 9, which is an output shaft of the stepping motor 1, extends through a through hole 102a of the printed circuit board 102 and a through hole 101a of the dial plate 101 and is exposed on a front side (a top side in FIG. 1) of the dial plate 101. The pointer 103 is fixed to a distal end of the pointer shaft 9. When a driving pulse is applied to the stepping motor 1 in accordance with a detection signal that indicates a measured physical quantity, the stepping motor 1 rotates the pointer shaft 9 by a predetermined rotation angle, and therefore the pointer 103 is rotated by the same rotational angle. Consequently, the measured physical quantity is indicated by the pointer 103, a gauge (not shown) and digits (not shown) provided on the dial plate 101.

A structure of the stepping motor 1 of the present embodiment will be described.

The stepping motor 1 is configured such that the stator 3 and a magnet rotor (or simply referred to as a rotor) 5 are received in a casing 2. Furthermore, a gear train G is received in the casing 2. The gear train G conducts a torque generated by the magnet rotor 5 to the pointer shaft 9 while decelerating rotation of the magnet rotor 5. A cover 11 is installed to the casing 2 to seal an interior of the casing 2. The cover 11 limits intrusion of foreign objects (e.g., dust, debris and the like) into the interior of the casing 2.

Figure 4:
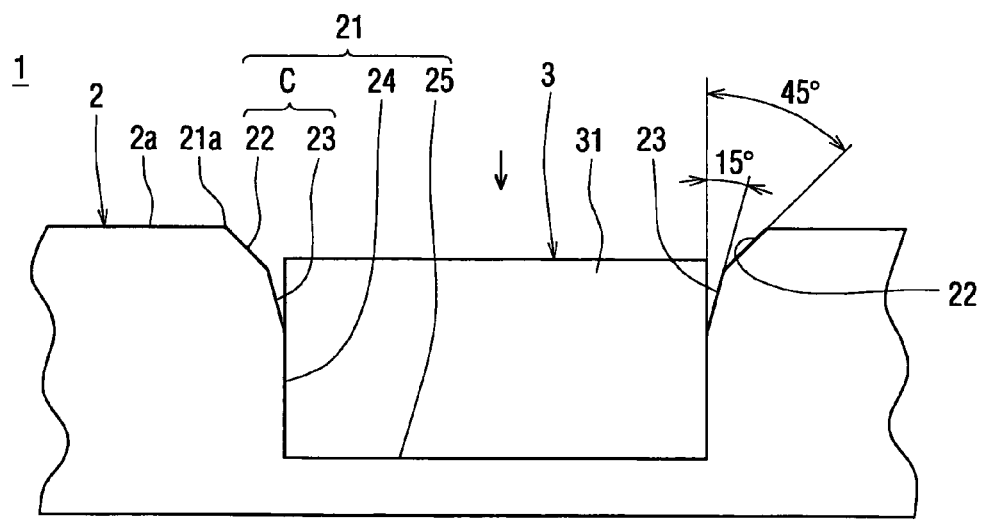
FIG. 4 is a partial view taken in a direction of arrow IV in FIG. 1.
Figure 9:
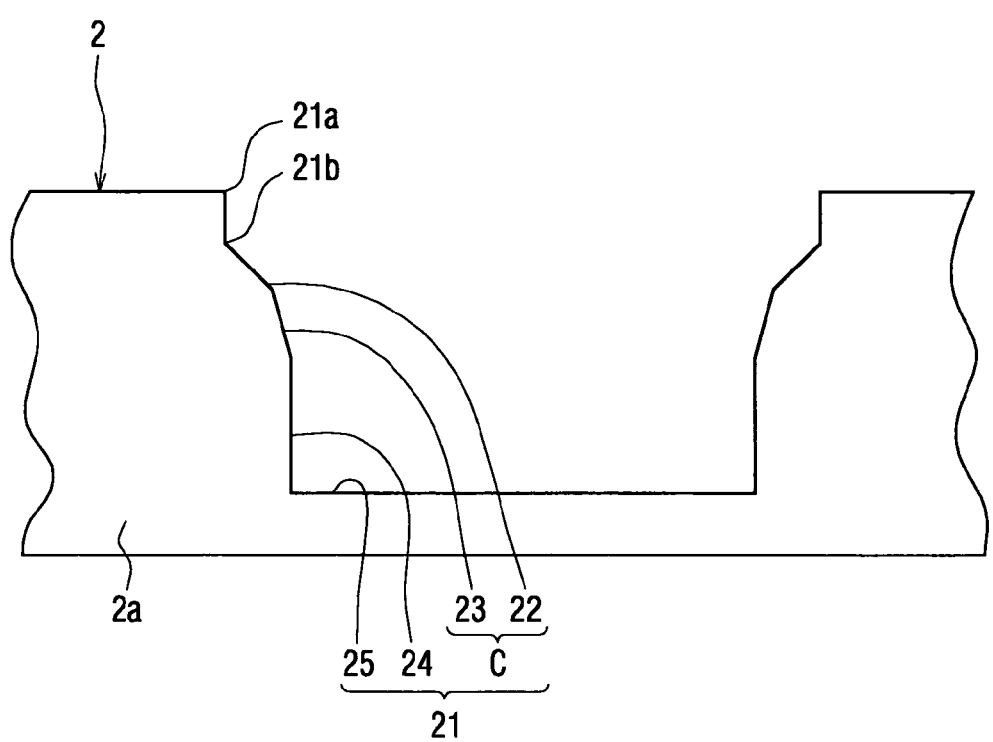
FIG. 9 is a partial cross sectional view showing a modification of the casing of the embodiment.

In the stepping motor 1 of the present embodiment, the casing 2 is formed by molding a resin material. The casing 2 is formed into a cup shaped body having a bottom. As shown in FIG. 4, a recess 21 is formed in an outer peripheral wall 2a of the casing 2. The stator 3, which will be described in more detail below, is press fitted and thereby fixed into the recess 21. As shown in FIG. 4, at each lateral side (each of the left and right lateral sides in FIG. 4) of the recess 21, two slant surfaces 22, 23 are arranged adjacent to an inlet opening end 21a of the recess 21, from which the stator 3 is press fitted into the recess 21. More specifically, the slant surface 22 may extend directly from the inlet opening end 21a of the recess 21, as shown in FIG. 4, or may extend from a spaced point, which is spaced from but is near the inlet opening end 21a of the recess 21 on a bottom 25 side of the inlet opening end 21a. For instance, as shown in FIG. 9, which indicates a modification of the casing 2 of FIG. 4, the slant surface 22 may extend from a spaced point 21b, which is spaced from the inlet opening end 21a of the recess 21 on the bottom 25 side of the inlet opening end 21a. Also, in some cases, the spaced point 21b may be further spaced from the inlet opening end 21a of the recess 21 in comparison to the one shown in FIG. 9. Referring back to FIG. 4, each slant surface 22, 23 is defined as a surface, which is angled relative to a press fitting direction of the stator 3 (a direction of an arrow in FIG. 4). The slant surfaces 22, 23 form a chamfered portion C, which has a progressively increasing width that increases from a bottom 25 side to an inlet opening side of the recess 21. The slant surface 22 and the slant surface 23 are arranged in this order from the inlet opening end 21a side of the recess 21 in the press fitting direction of the stator 3 (the direction of the arrow in FIG. 4). The slant surface 23 is arranged adjacent to the press fitting portion 24, which extends parallel to the press fitting direction of the stator 3 (the direction of the arrow in FIG. 4). The stator 3 is press fitted to the press fitting portion 24. An angle of the slant surface 22 with respect to the press fitting direction of the stator 3 (the direction of the arrow in FIG. 4) is set to be about 45 degrees. Furthermore, an angle of the slant surface 23 with respect to the press fitting direction of the stator 3 (the direction of the arrow in FIG. 4) is set to be 15 degrees. Therefore, the angles of the slant surfaces 22, 23 with respect to the press fitting direction of the stator 3 decrease from the inlet opening end 21a side of the recess 21 toward the bottom 25 side of the recess 21. Here, it should be noted that the angle of the slant surface 23 with respect to the press fitting direction of the stator 3 may be changed to an angle less than 15 degrees (e.g., 10 degrees or less) in some cases.

Figure 3:
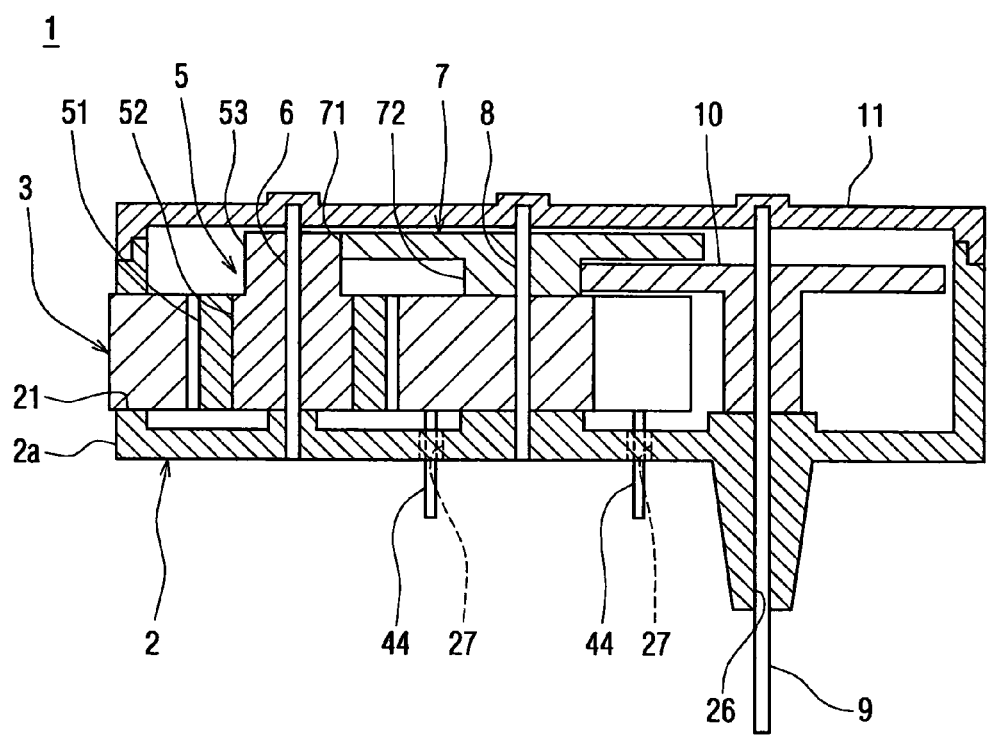
FIG. 3 is a cross sectional view taken along line III-III in FIG. 2.

In addition, as shown in FIG. 3, a shaft 6 is fixed to the casing 2. The shaft 6 forms a rotational center of the magnet rotor 5. The shaft 6 is made of, for example, non-magnetic metal.

Further, as shown in FIG. 3, an idler shaft 8 is fixed to the casing 2. The idler shaft 8 forms a rotational center of an idler 7 that constitutes the gear train G described below.

Furthermore, through holes 26, 27 are provided in the casing 2. The pointer shaft 9 extends outward from the casing 2 through the through hole 26, and terminal pins 44 of coil elements 4 described below extend outward from the casing 2 through the through holes 27.

The stepping motor 1 is fixed to the printed circuit board 102 such that a bottom 25 side of the recess 21 of the casing 2 is placed adjacent to the printed circuit board 102.

The stator 3 includes the tubular yoke 31 and the two coil elements 4. The stator 3 is immovably secured in the casing 2.

Figure 5:
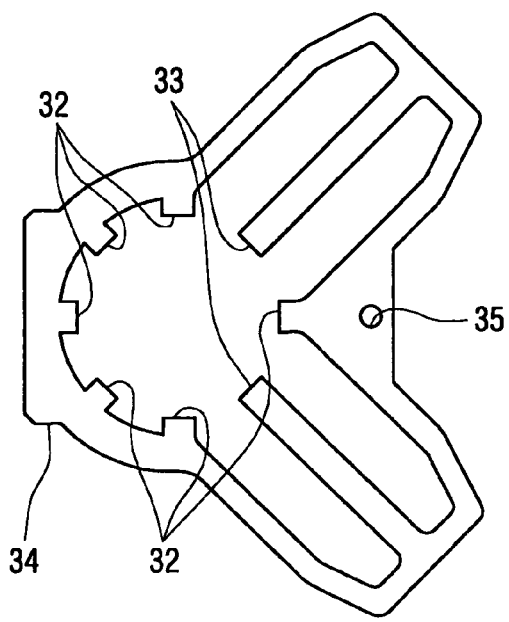
FIG. 5 is a plan view of a yoke of the stepping motor.

The yoke 31 is formed by laminating (stacking) a plurality of thin magnetic metal sheets, such as silicon steel plates. As shown in FIG. 5, eight salient poles 32, 33 are arranged at equal angular intervals, i.e., at 45 degree intervals in a circumferential direction and protrude radially inwardly. Radial distal ends of the salient poles 32, 33 are positioned along an imaginary circle, which is coaxial with the rotational center of the magnet rotor 5. Furthermore, two salient poles 33 among the eight salient poles 32, 33 are displaced from one another by 90 degrees and are longer than the other six salient poles 32 in the radial direction. Coil elements 4 are arranged around the salient poles 33, respectively. The yoke 31 includes a press fitting portion 34, which is press fitted into the recess 21 of the casing 2. Furthermore, a through hole 35 is formed in the yoke 31 to engage with the idler shaft 8 secured to the casing 2. The through hole 35 has a diameter, which is set to enable smooth manual fitting of the idler shaft 8 into the through hole 35.

Each of the coil elements 4 has a cylindrical bobbin 41 made of, for example, a resin material, and a conductive wire 43 is wound around the cylindrical bobbin 41, so that a solenoid 42 is formed. Two terminal pins 44 are secured to two ends, respectively, of the bobbin 41 to externally connect the solenoid 42. Two ends of the conductive wire 43, which forms the solenoid 42, are electrically connected to the terminal pins 44, respectively. The bobbin 41 has a hollow interior, which is configured to have a rectangular cross section that is homothetic to a cross section of the corresponding salient pole 33, so that the salient pole 33 is insertable into the hollow interior of the bobbin 41 in a manner that limits relative rotation of the salient pole 33 in the hollow interior of the bobbin 41. When the stator 3 is fixed to the casing 2, the terminal pins 44 are led to the outside of the casing 2 through the through holes 27 provided in the casing 2. Then, when the stepping motor 1 is fixed to the printed circuit board 102, the terminal pins 44 are inserted into through holes 102b, respectively, of the printed circuit board 102 and are soldered to corresponding parts, respectively, provided on a surface of the printed circuit board 102.

Referring to FIG. 3, the magnet rotor 5 has a magnet 51 and a resin boss portion 52. The magnet 51 is formed into a ring shape and is made of a ferromagnetic material, such as a ferrite material. The boss portion 52 is fitted to an inner peripheral part of the magnet 51. The magnet 51 is magnetized in such a manner that magnetic poles are alternately arranged at equal angular intervals in a circumferential direction to have the N-S-N-S . . . arrangement. In the stepping motor 1 of the present embodiment, ten magnetic poles are provided.

The boss portion 52 of the magnet rotor 5 is rotatably fitted to the shaft 6, which is secured to the casing 2. When the magnet rotor 5 is fitted to the shaft 6 of the casing 2, the ring shaped magnet 51 is arranged in a coaxial manner with respect to the salient poles 32, 33 of the stator 2, and a uniform clearance is formed between an outer peripheral surface the magnet 51 and the respective salient poles 32, 33. In this way, the outer peripheral surface of the magnet rotor 5 is radially opposed to the respective salient poles 32, 33 of the stator 2, and the magnet rotor 5 forms a magnetic circuit in corporation with the coil elements 4 and the yoke 31.

A pinion 53, which is one of gears of the gear train G, is integrally formed in the boss portion 52 of the magnet rotor 5.

Figure 2:
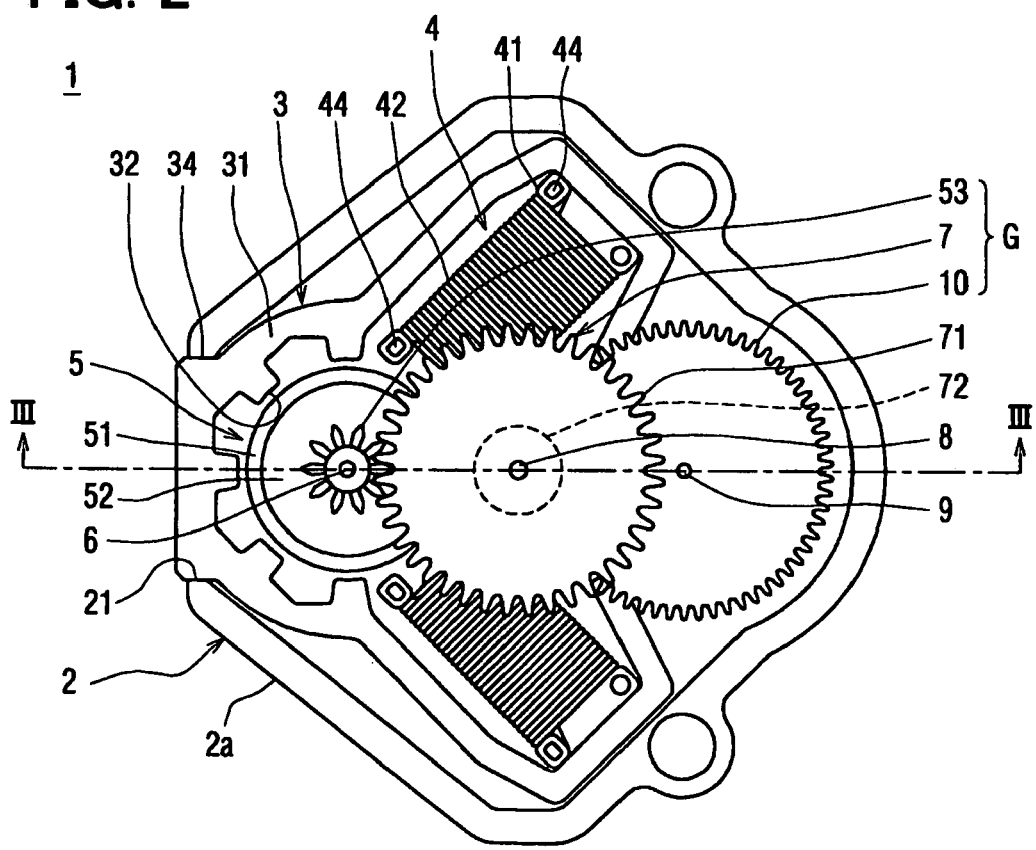
FIG. 2 is a plan view taken in a direction of arrow II in FIG. 1, showing the stepping motor, from which a cover is removed for the sake of easy understanding.

Referring to FIG. 2, the gear train G includes the pinion 53 of the magnet rotor 5, the idler 7 and an output gear 10 secured to the pointer shaft 9 (the output shaft of the stepping motor 1), which are arranged in this order from the torque source side and are meshed with one another. The idler 7 is rotatably fitted to the idler shaft 8, which is fixed to the casing 2. The idler 7 includes a large gear 71 and a small gear 72, which are coaxial to each other. The large gear 71 is meshed with the pinion 53, and the small gear 72 is meshed with the output gear 10.

In the gear train G, the number Z53 of teeth of the pinion 53, the number Z71 of teeth of the large gear 71 of the idler 7, the number Z72 of teeth of the small gear 72 of the idler 7 and the number Z10 of teeth of the output gear 10 have the relationship of Z53<Z71 and Z72<Z10. Thus, in the stepping motor 1 of the above embodiment of the present invention, the gear train G decelerates the rotational speed of the magnet rotor 5 and transmits it to the pointer shaft 9.

As shown in FIG. 1, a cover 11 is installed to the casing 2, which receives the above-described components, so that the interior of the casing 2 is air-tightly closed to limit external intrusion of foreign objects or water droplets into the interior of the casing 2.

Next, a method for assembling the stepping motor 1 of the present embodiment will be described while mainly focusing on the recess 21 of the casing 2, into which the stator 3 is press fitted.

Here, it should be noted that the assembling of the coil elements 4 to the yoke 31 and the assembling of the shaft 6 and the idler shaft 8 to the casing 2 are finished before the assembling of the stator 3 into the casing 2.

First, a distal end of the idler shaft 8 is inserted into the through hole 35, which is provided in the yoke 31 of the stator 3. Then, distal ends of the terminal pins 44 are inserted through the through holes 27 of the casing 2. At this time, a space is formed between each terminal pin 44 and an inner peripheral surface of the corresponding through hole 27, so that the stator 3 can be rotated about the idler shaft 8 by the distance that corresponds to the space between the terminal pin 44 and the inner peripheral surface of the corresponding through hole 27. In other words, the positional relationship between the stator 3 and the casing 2 is not fixed in this state.

Figure 6:
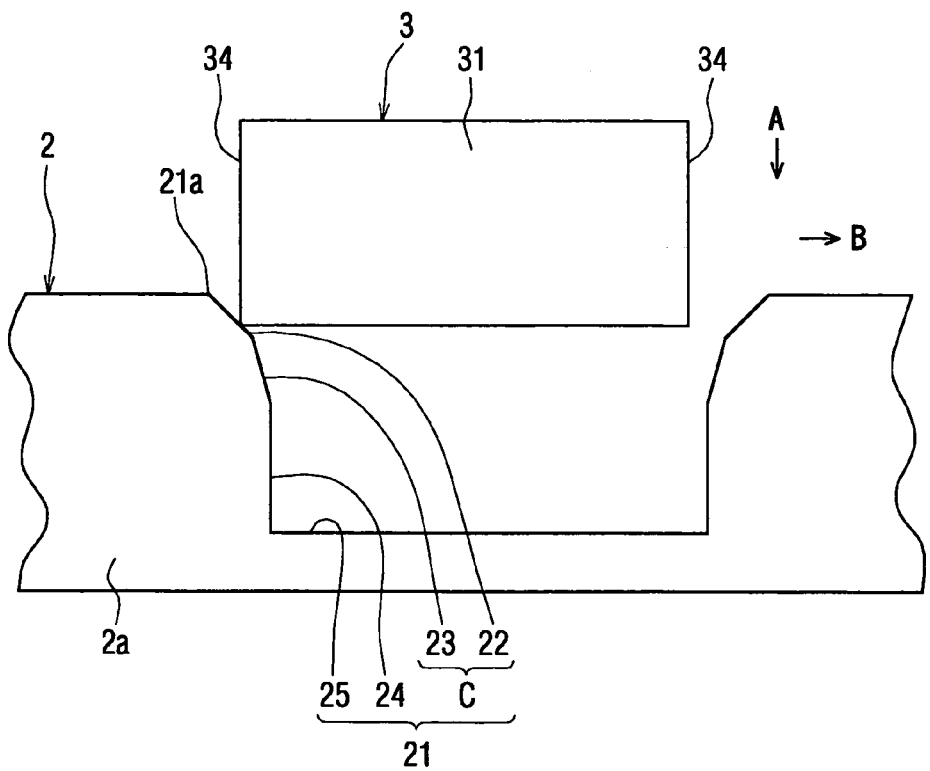
FIG. 6 is a descriptive partial view showing a positional relationship between a stator and a casing of the stepping motor in a press fitting operation of the stator into the casing.

Next, the position of the press fitting portion 34 of the yoke 31 is adjusted in such a manner that the press fitting portion 34 of the yoke 31 is placed over the recess 21 of the casing 2, and then the stator 3 is pressed toward the casing 2 side (more specifically, the bottom 25 side of the recess 21 of the casing 2), i.e., in a direction of arrow A in FIG. 6. Then, as shown in FIG. 6, the yoke 31 contacts the slant surface 22 of the casing 2. When the stator 3 is further pressed toward the casing 2 side, the yoke 31 of the stator 3 is guided by the slant surface 22, so that the stator 3 is rotated or is shifted in a direction of arrow B in FIG. 6 and is moved toward the casing 2 side.

Figure 7:
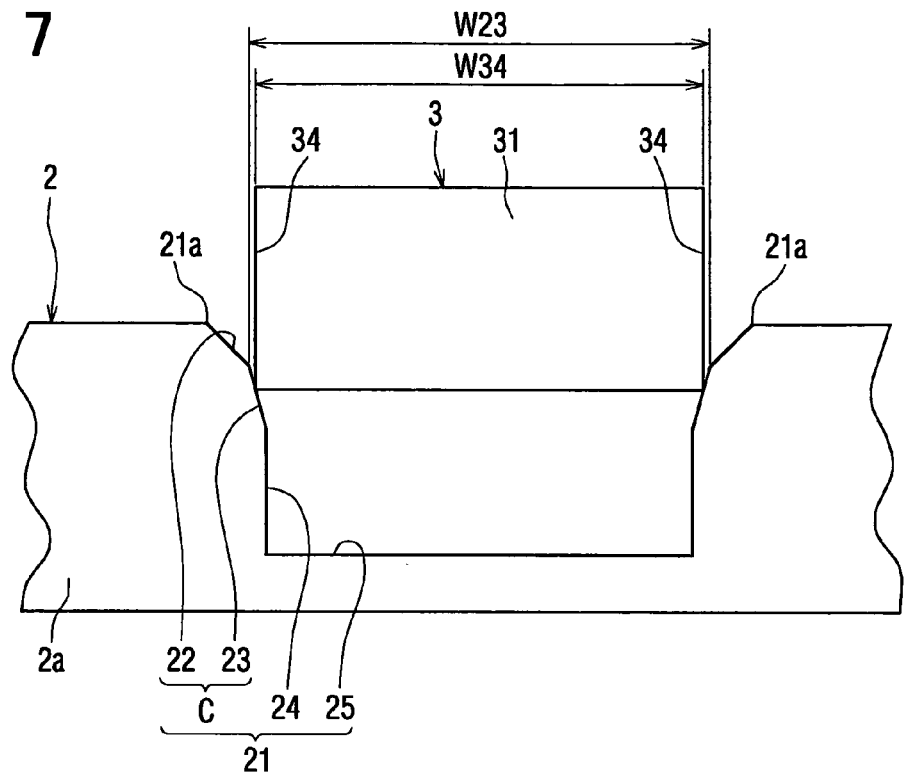
FIG. 7 is another descriptive partial view showing another positional relationship between the stator and the casing in the press fitting operation of the stator into the casing.

With reference to FIG. 7, a width W23 of the recess 21, which is measured at a connection between the slant surface 22 and the slant surface 23, is set to be slightly larger than a width W34 of the press fitting portion 34 of the yoke 31. Thus, when the stator 3 is further pressed toward the casing 2 side, a stator 2 side end of the yoke 31 passes the slant surface 22 and reaches the slant surface 23 at each lateral side (each of the left and right lateral sides in FIG. 7) of the recess 21. At this time, the opposed corners of the press fitting portion 34 of the yoke 31 are engaged with the slant surfaces 23, respectively, of the casing 23, as shown in FIG. 7.

Thereafter, when the stator 3 is further pressed toward the casing 2 side, the yoke 31 is moved toward the casing 2 side while expanding the width of the recess 21 at the left and right slant surfaces 23 of the casing 2. Then, the yoke 31 reaches the press fitting portion 24 of the recess 21. In this stage, the pressing force is applied from the yoke 31 to the left and right slant surfaces 23 of the casing 2 at each contact point between the corresponding corner of the press fitting portion 34 of the yoke 31 and the corresponding slant surface 23 of the casing 2. Since the angle of the slant surface 23 with respect to the press fitting direction of the stator 3 is set to be 15 degrees, a component of the pressing force, which acts in a direction perpendicular to the slant surface 23, is reduced in comparison to the previously proposed stepping motor, in which the angle of the slant surface 23 with respect to the press fitting direction is set to be about 45 degrees. More specifically, scraping of the casing 2 by the corners of the yoke 31 is effectively limited.

When the stator 3 is further pressed toward the casing 2 side, the yoke 31 is moved toward the casing 2 side while expanding the width of the recess 21 of the casing 2. Then, the stator 3 engages the bottom 25 and is placed in the position shown in FIG. 4. Therefore, the press fitting operation of the stator 3 into the casing 2 is completed.

Thereafter, the magnet rotor 5 is fitted to the shaft 6 of the casing 2.

Then, the pointer shaft 9 is fitted into the through hole 26. By this time, the output gear 10 is secured to the pointer shaft 9.

Next, the idler 7 is fitted to the idler shaft 8 of the casing 2. At this time, the large gear 71 of the idler 7 is meshed with the pinion 53 of the magnet rotor 5, and the small gear 72 of the idler 7 is meshed with the output gear 10 of the pointer shaft 9.

Thereafter, the cover 11 is fixed to the casing 2. This ends the assembly of the stepping motor 1.

In the stepping motor 1 of the present embodiment, the chamfered portion C, which is arranged adjacent to the inlet opening end 21a of the recess 21 at each lateral side of the recess 21 to progressively increase the width of the recess 21 from the bottom 25 side to the inlet opening end 21a side of the recess 21, includes the multiple slant surfaces 22, 23, more specifically the two slant surfaces 22, 23, which are arranged one after another in the press fitting direction of the stator 3. Also, in each chamfered portion C, the angle of the furthermost one 23 of the slant surfaces 22, 23, which is furthermost from the inlet opening end 21a of the recess 21, with respect to the press fitting direction of the stator 3 is set to be smallest among the angles of the slant surfaces 22, 23. Specifically, the angle of the slant surface 22 with respect to the press fitting direction of the stator 3 is set to be 45 degrees, and the angle of the slant surface 23 with respect to the press fitting direction of the stator 3 is set to be 15 degrees.

In this way, there is provided the stepping motor, which can more effectively limit generation of the foreign objects through scraping of the casing 2 by the corners of the stator 3 at the time of press fitting of the stator 3 into the casing 2.

Figure 8:
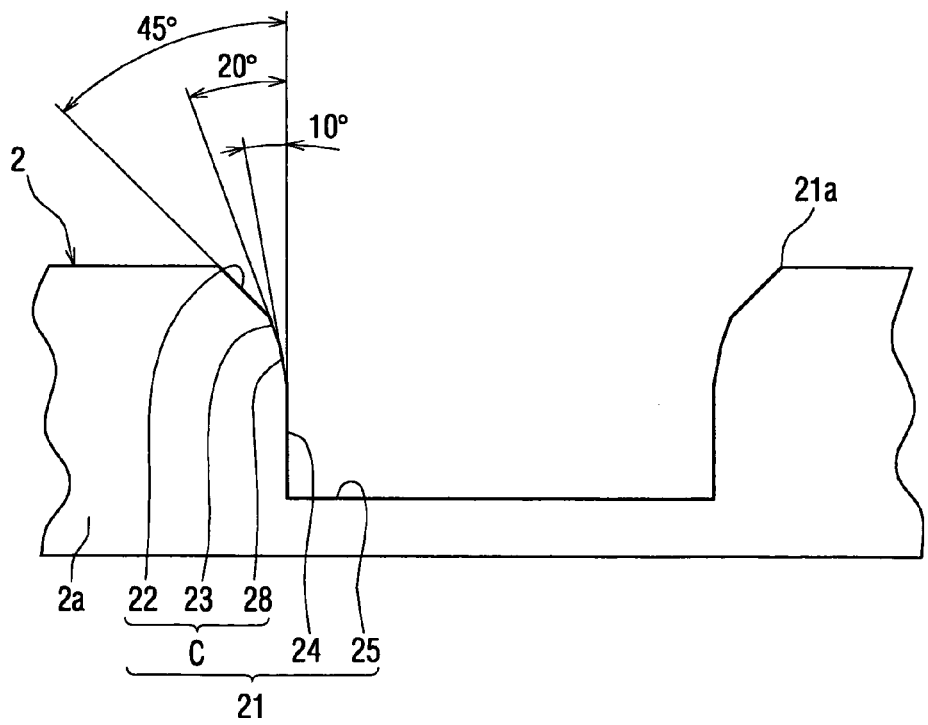
FIG. 8 is a partial view showing a modification of the casing of the stepping motor of the embodiment.

FIG. 8 shows a schematic cross sectional view showing a modification of the casing 2 of the stepping motor 1 of the above embodiment.

In this modification, the number of the slant surfaces of each chamfered portion C is changed from two to three. More specifically, as shown in FIG. 8, the chambered portion C includes the slant surface 22, the slant surface 23 and a slant surface 28. However, it should be noted that the number of the slant surfaces may be increased beyond three (i.e., the number higher than three), if appropriate.

The angle of the slant surface 22 with respect to the press fitting direction of the stator 3 is set to be 45 degrees, and the angle of the slant surface 23 with respect to the press fitting direction of the stator 3 is set to be 20 degrees. Also, the angle of the slant surface 28 with respect to the press fitting direction of the stator 3 is set to be 10 degrees. Here, the angle of the furthermost one 28 of the slant surfaces 22, 23, 28, which is furthermost from the inlet opening end 21a of the recess 21, with respect to the press fitting direction of the stator 3 is set to be smallest among the above three angles. It should be noted that, similar to the above embodiment, this angle of the slant surface 28 with respect to the press fitting direction of the stator 3 may be changed to 15 degrees (or alternatively to any appropriate angle less than 15 degrees) in some cases. According to experimental result, when the angle of the furthermost one of the slant surfaces, which is furthermost from the inlet opening end 21a of the recess 21, with respect to the press fitting direction of the stator 3 is set to be 15 degrees or less, generation of scraped debris at the time of press fitting of the stator into the casing can be significantly reduced.

Even with the above construction, similar to the case of the stepping motor 1 of the above embodiment, there is provided the stepping motor, which can more effectively limit generation of the foreign objects through scraping of the casing 2 by the corners of the stator 3 at the time of press fitting the stator 3 into the casing 2.

In the stepping motor 1 of the above embodiment and the above modification, the casing 2 is made of the resin material. However, the material of the casing 2 is not limited to the resin material, and any other suitable material, such as aluminum, can be used as the material of the casing 2.

Furthermore, in the stepping motor 1 of the above embodiment and the above modification, the rotational force of the magnet rotor 5 is transmitted to the pointer shaft 9 through the gear train G. However, it is not required to use the gear train G in some cases. For example, the pointer shaft 9 may be formed directly in the magnet rotor 5, and therefore the gear train G may be omitted.

In the stepping motor 1 of the above embodiment, the angle of the slant surface 22 with respect to the press fitting direction of the stator 3 is set to be 45 degrees, and the angle of the slant surface 23 with respect to the press fitting direction of the stator 3 is set to be 15 degrees. However, these angles are not necessarily limited to these values. That is, in place of these angles, any other angles can be set as long as the angles of the slant surfaces with respect to the press fitting direction of the stator decrease from the inlet opening end side of the recess toward the bottom side of the recess.

Furthermore, in the above embodiment and the modification, the stepping motor 1 is used in a pointer 103 drive movement of the instrument cluster 100 of the vehicle. However, it is not necessary to implement the stepping motor 1 of the present invention in the pointer 103 drive movement, and the present invention can be applied to a stepping motor of any other consumer product(s).

Additional advantages and modifications will readily occur to those skilled in the art. The invention in its broader terms is therefore not limited to the specific details, representative apparatus, and illustrative examples shown and described.

What is claimed is:

1. A stepping motor comprising:

a stator; and a casing that receives and holds the stator, wherein:

the casing has a recess, into which the stator is securely press fitted through an inlet opening end of the recess in a press fitting direction;

the recess has a chamfered portion and a press fitting portion, which are arranged one after another in this order in a direction away from the inlet opening end of the recess;

the chamfered portion is arranged between the inlet opening end of the recess and a bottom of the recess in such a manner that a width of the recess is progressively increased along the chamfered portion from a bottom side of the recess toward an inlet opening end side of the recess;

the chamfered portion has a plurality of slant surfaces, which are arranged one after another in the press fitting direction of the stator;

angles of the plurality of slant surfaces with respect to the press fitting direction of the stator decrease from the inlet opening end side of the recess toward the bottom side of the recess; and the press fitting portion is arranged adjacent to the chamfered portion and extends toward the bottom of the recess in a direction parallel to the press fitting direction of the stator.

2. The stepping motor according to claim 1, wherein the angle of an adjacent one of the plurality of slant surfaces, which is adjacent to the press fitting portion, with respect to the press fitting direction of the stator is in a range of 10-15 degrees.

3. The stepping motor according to claim 1, wherein a number of the plurality of slant surfaces is two.

4. The stepping motor according to claim 1, further comprising a rotor, which is rotted by a magnetic flux generated from the stator, wherein a shaft is secured to the casing and forms a rotational center of the rotor.

5. The stepping motor according to claim 1, wherein the casing is made of a resin material.

6. The stepping motor according to claim 1, wherein a number of the plurality of slant surfaces is three or higher.

7. The stepping motor according to claim 1, wherein the angle of an adjacent one of the plurality of slant surfaces, which is adjacent to the press fitting portion, with respect to the press fitting direction of the stator is equal to or less than 15 degrees.

* * * * *